(12) United States Patent
Nishizawa et al.

(10) Patent No.: US 6,537,937 B1
(45) Date of Patent: Mar. 25, 2003

(54) ALKALI-FREE GLASS

(75) Inventors: Manabu Nishizawa, Kanagawa (JP); Yasumasa Nakao, Kanagawa (JP); Akio Koike, Kanagawa (JP); Junichiro Kase, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 53 days.

(21) Appl. No.: 09/631,113

(22) Filed: Aug. 2, 2000

(30) Foreign Application Priority Data

Aug. 3, 1999 (JP) ............ 11-220244
May 12, 2000 (JP) ......... 2000-140736

(51) Int. Cl.⁷ .............................. C03C 3/091
(52) U.S. Cl. ........................... 501/66; 501/70
(58) Field of Search ................ 501/66, 69, 70, 501/72

(56) References Cited

U.S. PATENT DOCUMENTS

| | | | |
|---|---|---|---|
| 5,244,847 A | | 9/1993 | Kushitani et al. |
| 5,348,916 A | | 9/1994 | Kushitani et al. |
| 5,508,237 A | * | 4/1996 | Moffatt et al. ........ 501/69 |
| 5,770,535 A | * | 6/1998 | Brix et al. ............ 501/67 |
| 5,801,109 A | | 9/1998 | Nishizawa et al. |
| 5,811,361 A | * | 9/1998 | Miwa ................. 501/66 |
| 5,851,939 A | | 12/1998 | Miwa |
| 5,885,914 A | | 3/1999 | Nishizawa et al. |
| 5,908,703 A | * | 6/1999 | Brix et al. ........... 501/66 |

FOREIGN PATENT DOCUMENTS

| | | | |
|---|---|---|---|
| DE | 19739912 C | * | 12/1998 |
| JP | 08-295530 A | * | 11/1996 |
| JP | 09-156953 A | * | 6/1997 |
| JP | 09-263421 A | * | 10/1997 |
| JP | 10-139467 A | * | 5/1998 |
| WO | WO 89/02877 A | * | 4/1989 |
| WO | WO 98/27019 | | 6/1998 |
| WO | WO 00/32528 | | 6/2000 |

* cited by examiner

Primary Examiner—David Sample
(74) Attorney, Agent, or Firm—Oblon, Spivak, McClelland, Maier & Neustadt, P.C.

(57) ABSTRACT

An alkali-free glass consisting essentially of:

| | |
|---|---|
| $SiO_2$ | 64 to 76 mol %, |
| $Al_2O_3$ | 5 to 14 mol %, |
| $B_2O_3$ | 5 to 16 mol %, |
| MgO | 1 to 16.5 mol %, |
| CaO | 0 to 14 mol %, |
| SrO | 0 to 6 mol %, and |
| BaO | 0 to 2 mol %. |

17 Claims, No Drawings

ALKALI-FREE GLASS

BACKGROUND OF THE INVENTION

1. Field of the Invention

The present invention relates to an alkali-free glass which is suitable as glass substrates for liquid crystal display devices or photomasks.

2. Discussion of Background

Heretofore, the following properties have been required for glass substrates to be used for display devices, particularly for glass substrates designed to have metal or oxide thin films formed on their surface.

(1) It contains substantially no alkali metal oxide i.e. it is alkali-free glass.

If alkali metal ions are contained in a glass substrate, they are likely to diffuse into the above thin film thereby to deteriorate the properties of the thin film.

(2) It has a high strain point, so that deformation of a glass substrate and/or shrinkage (shrinkage accompanied by stabilization of the glass structure) due to heating during the process for forming a thin film, can be suppressed to the minimum level.

(3) It has high chemical durability (BHF resistance) against buffered hydrofluoric acid (a mixed solution of hydrofluoric acid and ammonium fluoride) to be used for etching of $SiO_x$ or $SiN_x$ formed on a glass substrate.

(4) It has high chemical durability (acid resistance) against etching by nitric acid, sulfuric acid, hydrochloric acid or the like used for etching of ITO (tin-doped indium oxide) or a metal electrode formed on a glass substrate.

(5) It has adequate chemical durability against an alkaline resist remover.

In recent years, a glass satisfying the following properties as well has been desired.

(a) It has a small specific gravity, so that the weight of a display device can be reduced.

(b) It has a small expansion coefficient, so that the temperature raising or lowering rate in a process for producing a display device can be increased, and the thermal shock resistance can be improved.

(c) It has higher acid resistance.

(d) It has a high Young's modulus, so as to reduce deflection of a glass substrate or a glass sheet before cutting out the glass substrate, by its own weight, and to make the glass substrate or the glass sheet scarcely breakable at the time of e.g. transportation.

(e) It is hardly devitrified.

SUMMARY OF THE INVENTION

A first object of the present invention is to provide an alkali-free glass which satisfies the properties (1) to (5) and (a) to (c).

A second object of the present invention is to provide an alkali-free glass which satisfies the properties (d) and (e) in addition to such properties.

The present invention provides an alkali-free glass consisting essentially of:

| | |
|---|---|
| $SiO_2$ | 64 to 76 mol %, |
| $Al_2O_3$ | 5 to 14 mol %, |
| $B_2O_3$ | 5 to 16 mol %, |
| MgO | 1 to 16.5 mol %, |
| CaO | 0 to 14 mol %, |
| SrO | 0 to 6 mol %, and |
| BaO | 0 to 2 mol %. |

DETAILED DESCRIPTION OF THE PREFERRED EMBODIMENTS

The alkali-free glass of the present invention (hereinafter referred to simply as the glass of the present invention) contains substantially no alkali metal oxide. The total content of alkali metal oxides is preferably not more than 0.5 mol %.

The specific gravity of the glass of the present invention is preferably at most 2.46. If it exceeds 2.46, it tends to be difficult to reduce the weight of a display device. It is more preferably at most 2.43, further preferably at most 2.40, particularly preferably at most 2.39, most preferably at most 2.38.

The average linear expansion coefficient α within a range of from 50 to 350° C. of the glass of the present invention is preferably at most $34 \times 10^{-7}$/° C. If it exceeds $34 \times 10^{-7}$/° C., the thermal shock resistance tends to deteriorate. It is more preferably at most $32 \times 10^{-7}$/° C., particularly preferably at most $30 \times 10^{-7}$/° C., most preferably at most $29 \times 10^{-7}$/° C. Further, a is preferably at least $24 \times 10^{-7}$/° C. If it is less than $24 \times 10^{-7}$/° C., expansion matching with $SiO_x$ or $SiN_x$ formed on the glass substrate, is likely to be difficult. From this viewpoint, it is more preferably at least $26 \times 10^{-7}$/° C., further preferably at least $27 \times 10^{-7}$/° C., particularly preferably at least $28 \times 10^{-7}$/° C., most preferably at least $30 \times 10^{-7}$/° C. In the following, an average linear expansion coefficient within a range of from 50 to 350° C. will be referred to simply as an expansion coefficient.

The strain point of the glass of the present invention is preferably at least 650° C., more preferably at least 660° C., further preferably at least 670° C., particularly preferably at least 675° C., most preferably at least 680° C.

The Young's modulus of the glass of the present invention is preferably at least 64 GPa, more preferably at least 68 GPa, further preferably at least 72 GPa, particularly preferably at least 73 GPa, most preferably at least 75 GPa.

The specific modulus of the glass of the present invention i.e. the value obtained by dividing the Young's modulus by the density, is preferably at least 27 MNm/kg. If it is less than 27 MNm/kg, the deflection of the glass substrate or the glass sheet prior to cutting out the glass substrate, by its own weight, tends to be too large. It is more preferably at least 28 MNm/kg, more preferably at least 29 MNm/kg, particularly preferably at least 30 MNm/kg, most preferably at least 31 MNm/kg.

The temperature $T_2$ at which the viscosity of the glass of the present invention becomes $10^2$ poise, is preferably at most 1,820° C. If it exceeds 1,820° C., melting of the glass tends to be difficult. It is more preferably at most 1,800° C., further preferably at most 1,780° C., particularly preferably at most 1,760° C., most preferably at most 1,750° C.

The temperature $T_4$ at which the viscosity of the glass of the present invention becomes $10^4$ poise, is preferably at most 1,380° C. If it exceeds 1,380° C., glass forming tends to be difficult. It is more preferably at most 1,360° C., particularly preferably at most 1,350° C., most preferably at most 1,340° C.

The viscosity $\eta_L$ at a liquidus temperature of the glass of the present invention is preferably at least $10^{3.5}$ poise. If it is less than $10^{3.5}$ poise, glass forming tends to be difficult. It is more preferably at least $10^{3.8}$ poise, particularly preferably at least $10^4$ poise, most preferably at least $10^{4.1}$ poise.

When the glass of the present invention is immersed in an aqueous hydrochloric acid solution having a concentration of 0.1 mol/l at 90° C. for 20 hours, it is desired that no turbidity, color change or cracking takes place on its surface. Further, the mass reduction ΔW per unit surface area of the glass obtained from the surface area of the glass and the mass change of the glass due to the above mentioned immersion, is preferably at most 0.6 mg/cm², more preferably at most 0.4 mg/cm², particularly preferably at most 0.2 mg/cm², most preferably at most 0.15 mg/cm²

Further, it is desired that when the glass of the present invention is immersed at 25° C. for 20 minutes in a solution (hereinafter referred to as a buffered hydrofluoric acid solution) obtained by mixing an aqueous ammonium fluoride solution having a mass percentage concentration of 40% and an aqueous hydrofluoric acid solution having a mass percentage concentration of 50% in a volume ratio of 9:1, the surface will not be turbidified. Hereinafter, this evaluation using the buffered hydrofluoric acid solution, will be referred to as BHF resistance evaluation. A case where the above surface will not be turbidified, will be regarded that the BHF resistance is good. Further, the weight loss per unit area of the glass obtained from the surface area of the glass and the mass change of the glass due to the above mentioned immersion, is desired to be at most 0.6 mg/cm².

A preferred embodiment of the present invention may, for example, be an alkali-free glass which consists essentially of:

| | |
|---|---|
| $SiO_2$ | 64 to 74 mol %, |
| $Al_2O_3$ | 5 to 14 mol %, |
| $B_2O_3$ | 6 to 10 mol %, |
| MgO | 3 to 16.5 mol %, |
| CaO | 0 to 5.4 mol %, |
| SrO | 0 to 2 mol %, and |
| BaO | 0 to 2 mol %. | wherein MgO+CaO+SrO+BaO is from 5 to 16.5 mol %, MgO/(MgO+CaO) is at least 0.4, SrO+BaO is from 0 to 2 mol %, and the specific gravity is at most 2.40.

Another preferred embodiment of the present invention may, for example, be an alkali-free glass which consists essentially of:

| | |
|---|---|
| $SiO_2$ | 66 to 74 mol %, |
| $Al_2O_3$ | 6 to 13 mol %, |
| $B_2O_3$ | 7 to 11 mol %, |
| MgO | 1 to 3 mol %, |
| CaO | 4 to 8 mol %, |
| SrO | 0 to 3 mol %, and |
| BaO | 0 to 2 mol %. | wherein MgO+CaO+SrO+BaO is at most 11.5 mol %, MgO/(MgO+CaO) is at least 0.2, the specific gravity is at most 2.40, and the Young's modulus is at least 72 GPa.

When it is desired to suppress formation of glass chips in scribe and break process which will be described hereinafter, it is preferred to adopt the following Embodiment A, B or C.

Namely, as another preferred embodiment (Embodiment A) of the present invention, an alkali-free glass may be mentioned, which consists essentially of:

| | |
|---|---|
| $SiO_2$ | 68.5 to 76 mol %, |
| $Al_2O_3$ | 5 to 12.5 mol %, |
| $B_2O_3$ | 5 to 16 mol %, |
| MgO | 1 to 16.5 mol %, |
| CaO | 0.5 to 14 mol %, |
| SrO | 0 to 3 mol %, and |
| BaO | 0 to 1.5 mol %. | wherein MgO/(MgO+CaO+SrO+BaO) is at least 0.15. Embodiment A is an embodiment suitable for use in a case where it is desired to further suppress formation of glass chips.

As still another preferred embodiment (Embodiment B) of the present invention, an alkali-free glass may be mentioned, which consists essentially of:

| | |
|---|---|
| $SiO_2$ | 64 to 76 mol %, |
| $Al_2O_3$ | 5 to 14 mol %, |
| $B_2O_3$ | 5 to 16 mol %, |
| MgO | 1 to 16.5 mol %, |
| CaO | 0.5 to 14 mol %, |
| SrO | 0 to 6 mol %, and |
| BaO | 0 to 1.5 mol %. | wherein MgO/(MgO+CaO+SrO+BaO) is at least 0.15, and $SiO_2+B_2O_3$ is at least 79 mol %. Embodiment B is an embodiment suitable for use when it is desired to further reduce the specific gravity and to further suppress formation of glass chips.

As another preferred embodiment (Embodiment C) of the present invention, an alkali-free glass may be mentioned, which consists essentially of:

| | |
|---|---|
| $SiO_2$ | 64 to 76 mol %, |
| $Al_2O_3$ | 7.5 to 14 mol %, |
| $B_2O_3$ | 5 to 16 mol %, |
| MgO | 1 to 8 mol %, |
| CaO | 2 to 10 mol %, |
| SrO | 0 to 2.5 mol %, and |
| BaO | 0 to 0.5 mol %. | wherein MgO+CaO+SrO+BaO is at most 11.5 mol %, $SrO+B_2O_3$ is from 0 to 2.5 mol %, and $SiO_2+B_2O_3$ is at most 80 mol %. This embodiment is an embodiment suitable for use when it is desired to further reduce the specific gravity and further improve the melting property.

Now, the above mention glass chips in scribe and break process will be described.

A glass substrate to be used for e.g. liquid crystal display devices, is one obtained by cutting a glass sheet in a desired size, and the cutting is carried out usually as follows. Namely, the glass sheet is scribed by e.g. a wheel cutter, and a bending stress is formed along the scribe line, for example, by a method of exerting a force to bend the glass sheet along the scribe line, thereby to cut the glass sheet. Glass chips are typically formed in this scribe and break process, but they may form from the edge during the handling of the glass substrate such as transportation of the glass substrate.

Glass chips brings about a problem that the glass substrate may be scratched, and if a glass substrate having chips deposited thereon is used for the production of e.g. a liquid crystal display device, a defective product will be produced. On the other hand, it is not easy to remove chips deposited on the glass substrate, for example, by washing the glass substrate. Accordingly, it is desired to suppress formation of glass chips.

The present inventors have found that in an alkali-free glass containing an alkaline earth metal oxide, if the BaO content increases, glass chips tend to form, and if the MgO content increases, glass chips tend to scarcely form. This is considered to be related with the flexibility of the network structure of glass.

The foregoing is a description relating to glass chips. However, a detailed description will be made in the following description of the respective component as the case requires.

Now, the composition of the glass of the present invention will be described, wherein mol % will be represented simply by %.

$SiO_2$ is essential as a network former. If it exceeds 76%, the melting property of the glass deteriorates, and the glass tends to be devitrified. It is preferably at most 74%, more preferably at most 72%, particularly preferably at most 71%. If it is less than 64%, increase of the specific gravity, lowering of the strain point, increase of the expansion coefficient, deterioration of the acid resistance, deterioration of the alkali resistance or deterioration of the BHF resistance tends to occur. It is preferably at least 66%, more preferably at least 68%, further preferably at least 68.5%, particularly preferably at least 69%, most preferably at least 69.5%.

$Al_2O_3$ is essential as a component to suppress phase separation of the glass and to increase the strain point. If it exceeds 14%, the glass tends to be devitrified, and the BHF resistance and/or the acid resistance tends to deteriorate. It is preferably at most 13%, more preferably at most 12.5%, particularly preferably at most 12%, most preferably at most 11.5%. If it is less than 5%, the glass tends to undergo phase separation, or the strain point tends to be low. It is preferably at least 6%, more preferably at least 7%, further preferably at least 7.5%, particularly preferably at least 8%, most preferably at least 8.5%.

The total content of $SiO_2$ and $Al_2O_3$ is preferably at least 76%. If it is less than 76%, the strain point tends to be low. The total content is preferably at least 77%, particularly preferably at least 79%.

$B_2O_3$ is essential as a component to reduce the specific gravity, to increase the BHF resistance, to improve the melting property of the glass, to prevent devitrification or to reduce the expansion coefficient. If it exceeds 16%, the strain point tends to be low, or the acid resistance tends to deteriorate, or inhomogeneity of glass attributable to evaporation of $B_2O_3$ at the time of melting the glass, tends to be remarkable. It is preferably at most 13%, more preferably at most 12%, particularly preferably at most 11%, most preferably at most 10%. If it is less than 5%, increase of the specific gravity, deterioration of the BHF resistance, deterioration of the melting property of the glass or increase of the expansion coefficient, and devitrification is likely to take place. It is preferably at least 6%, more preferably at least 6.5%, particularly preferably at least 7%, most preferably at least 8%.

The total content of $SiO_2$ and $B_2O_3$ i.e. $SiO_2+B_2O_3$, is preferably at least 75%. If it is less than 75%, the specific gravity tends to be too large, or the expansion coefficient tends to be too large. It is more preferably at least 77%, particularly preferably at least 78%, most preferably at least 79%.

When it is desired to further reduce the specific gravity, $SiO_2+B_2O_3$ is preferably at least 78%, more preferably at least 79%.

When it is desired to further improve the melting property of the glass, $SiO_2+B_2O_3$ is preferably at most 82%, more preferably at most 81%, particularly preferably at most 80%, most preferably at most 79%.

$Al_2O_3/B_2O_3$ obtained by dividing the content of $Al_2O_3$ by the content of $B_2O_3$, is preferably at most 1.7. If it exceeds 1.7, the BHF resistance is likely to be low. It is more preferably at most 1.6, particularly preferably at most 1.5. Further, $Al_2O_3/B_2O_3$ is preferably at least 0.8. If it is less than 0.8, the strain point tends to be low. It is more preferably at least 0.9, particularly preferably at least 1.0.

$(Al_2O_3+B_2O_3)/SiO_2$ obtained by dividing the total content of $Al_2O_3$ and $B_2O_3$ by the content of $SiO_2$, is preferably at most 0.32. If it exceeds 0.32, the acid resistance is likely to deteriorate. It is more preferably at most 0.31, particularly preferably at most 0.30, most preferably at most 0.29.

MgO is essential as a component to improve the melting property of the glass and to suppress formation of glass chips. If it exceeds 16.5%, the glass is likely to undergo phase separation or devitrification, the BHF resistance tends to deteriorate, or the acid resistance tends to deteriorate. It is preferably at most 12%, more preferably at most 8%, particularly preferably at most 6%, most preferably at most 4%. To prevent devitrification, it is preferably at most 3%, more preferably at most 2%. If it is less than 1%, the specific gravity tends to be too large, the melting property of the glass tends to deteriorate, or glass chips are likely to form. In a case where it is desired to reduce the specific gravity, to further improve the melting property of the glass, or to suppress formation of glass chips, it is preferably at least 1.5%, more preferably at least 2%, particularly preferably at least 3%, most preferably at least 3.2%.

The effect of MgO to suppress formation of glass chips is considered to be as follows. Namely, an alkaline earth metal oxide such as MgO is considered to enter into a network structure of glass and to fill spaces in the network structure. However, if such spaces decrease beyond a certain limit, the flexibility of the network structure decreases, whereby the network will be susceptible to breakage. $Mg^{2+}$ has the smallest ionic radius (0.065 nm) among alkaline earth metals, and accordingly, the effect of MgO to fill the above mentioned spaces is smallest among the alkaline earth metal oxides, and consequently, MgO is considered to be excellent in the effect for suppressing formation of glass chips. In this connection, the ionic radii of $Ca^{2+}$, $Sr^{2+}$ and $Ba^{2+}$ are 0.099 nm, 0.113 nm and 0.135 nm, respectively.

To prevent devitrification, it is preferred to bring the content of $Al_2O_3$ to a level of at most 13% and to bring the content of MgO to a level of at most 6%. It is more preferred to bring the content of $Al_2O_3$ to a level of at most 13%, and to bring the content of MgO to a level of at most 3%, further preferred to bring the content of $Al_2O_3$ to a level of at most 12%, and to bring the content of MgO to a level of at most 3%.

CaO is not essential, but may be incorporated up to 14% in order to reduce the specific gravity, to improve the melting property of the glass or to prevent devitrification. If it exceeds 14%, the specific gravity or the expansion coefficient is likely to increase. Further, devitrification is likely to take place, or glass chips are likely to form. CaO is preferably at most 12%, more preferably at most 10%, particularly preferably at most 8%, most preferably at most 5.4%. When CaO is incorporated, its content is preferably at least 0.5%, more preferably at least 1%, particularly preferably at least 2%.

MgO/(MgO+CaO) obtained by dividing the content of MgO by the total content of MgO and CaO is preferably at least 0.2. If it is less than 0.2, the specific gravity or the expansion coefficient is likely to increase. It is more preferably at least 0.25, particularly preferably at least 0.4.

SrO is not essential, but may be incorporated up to 6% to suppress the phase separation of the glass or to prevent devitrification. If it exceeds 6%, the specific gravity is likely to be too large. It is preferably at most 3%, more preferably at most 2.5%, particularly preferably at most 2%. If SrO is incorporated, the content is preferably at least 0.5%, more preferably at least 1%, particularly preferably at least 1.2%. In a case where it is desired to further reduce the specific gravity, it is preferred to be essentially free of SrO.

To suppress formation of glass chips, it is preferred to incorporate CaO and/or SrO in addition to MgO. By such coexistence of alkaline earth metal oxides having different ion radii, it is expected that the network structure of glass tends to be more flexible. In such a case, it is preferred that CaO/(MgO+CaO+SrO) is from 0.3 to 0.85, or SrO/(MgO+CaO+SrO) is at most 0.55.

BaO is not essential, but may be incorporated up to 2% to suppress the phase separation of the glass or to prevent devitrification. If it exceeds 2%, the specific gravity is likely to be too large, or glass chips are likely to form. It is preferably at most 1.5%, more preferably at most 1%, particularly preferably at most 0.5%. In a case where it is desired to further reduce the specific gravity, or to suppress formation of glass chips, it is preferred to be essentially free of BaO.

SrO+BaO i.e. the total content of SrO and BaO, is preferably at most 6%. If it exceeds 6%, the specific gravity is likely to be too large. It is more preferably at most 2.5%, particularly preferably at most 2%. In a case where it is desired to further reduce the specific gravity or in a case where $SiO_2+B_2O_3$ is at most 79%, SrO+BaO is preferably at most 1.5%, more preferably at most 1%, and it is particularly preferred not to contain either one of SrO and BaO. Further, in a case where it is desired to prevent devitrification, SrO+BaO is preferably at least 0.5%, more preferably at least 1%.

MgO+CaO+SrO+BaO i.e. the total content of MgO, CaO, SrO and BaO, is preferably at most 16.5%. If it exceeds 16.5%, the specific gravity is likely to be too large, or the expansion coefficient is likely to be too large. It is more preferably at most 14%, further preferably at most 13%, particularly preferably at most 11.5%, most preferably at most 10.5%. Further, MgO+CaO+SrO+BaO is preferably at least 5%. If it is less than 5%, the melting property of the glass tends to deteriorate. It is more preferably at least 6%, particularly preferably at least 7%.

$Al_2O_3$+MgO+CaO+SrO+BaO i.e. the total content of $Al_2O_3$, MgO, CaO, SrO and BaO, is preferably at least 15%. If it is less than 15%, the Young's modulus is likely to be too small. More preferably, it is at least 16%, particularly preferably at least 18%.

MgO/(MgO+CaO+SrO+BaO) obtained by dividing the content of MgO by the total content of MgO, CaO, SrO and BaO, is preferably at least 0.1. If it is less than 0.1, the specific gravity is likely to be too large, or glass chips are likely to form. It is more preferably at least 0.15, further preferably at least 0.2, particularly preferably at least 0.25, most preferably at least 0.4.

CaO/(MgO+CaO+SrO+BaO) obtained by dividing the content of CaO by the total content of MgO, CaO, SrO and BaO, is preferably at most 0.85. If it exceeds 0.85, glass chips are likely to form. It is more preferably at most 0.8, particularly preferably at most 0.65, most preferably at most 0.6.

The glass of the present invention consists essentially of the above described components, but other components may be incorporated within a range not to impair the purpose of the present invention. The total content of such other components is preferably not more than 10 mol %, more preferably not more than 5 mol %.

As such other components, the following may be mentioned. Namely, $SO_3$, F, Cl, $SnO_2$, etc., may be incorporated in a total content of up to 2 mol % in order to improve the melting, refining or forming property, as the case requires. Further, $Fe_2O_3$, $ZrO_2$, $TiO_2$, $Y_2O_3$, etc., may suitably be incorporated.

Further, it is preferred to be essentially free of $As_2O_3$, $Sb_2O_3$, PbO, ZnO or $P_2O_5$. Namely, the content of any one of these five components is preferably not more than 0.1%. More preferably, the total content of these five components is not more than 0.1%.

With respect to ZnO, it is preferred to be essentially free of ZnO in the case of manufacturing by the float process, but in the case of manufacturing by other forming process such as the downdraw process, ZnO may be contained in an amount exceeding 0.1%, as the case requires.

Especially when it is desired to increase the Young's modulus or to prevent devitrification, it is preferably incorporated within a range of up to 2%. If it exceeds 2%, the specific gravity tends to be too large.

Further, with respect to $As_2O_3$ or $Sb_2O_3$, when it is desired to further improve the refining, it may be contained in an amount exceeding 0.1%, as the case requires.

When forming is carried out by the float process, it is preferred to be essentially free of $TiO_2$. However, when forming is carried out by other forming process such as by the downdraw process, it may be incorporated in an amount exceeding 0.01%, as the case requires. Especially when it is desired to increase the Young's modulus, or to prevent devitrification, it is preferably incorporated within a range of up to 2%. If it exceeds 2%, the specific gravity tends to be too large.

A process for producing the glass of the present invention is not particularly limited, and various production processes may be employed. For example, commonly employed starting materials are mixed to have the desired composition, and this mixture is heated and melted in a melting furnace at a temperature of from 1,500 to 1,600° C. or from 1,600 to 1,700° C. Bubbling, addition of fining agent or stirring may be carried out to homogenize the glass. In a case where the glass is to be used as a glass substrate for liquid crystal display device or photomask, it is formed into a predetermined thickness by a well known process such as the pressing process, the downdraw process or the float process, followed by annealing and processing such as cutting or polishing to obtain a substrate having a predetermined size and shape.

Now, the present invention will be described in further detail with reference to Examples. However, it should be understood that the present invention is by no means restricted to such specific Examples.

EXAMPLES 1 to 45

The specific gravities d, the expansion coefficients a (unit: $10^{-7}$/° C.) and the strain points (unit: ° C.) of glasses 1 to 45 having the compositions shown by mol % in the rows for from $SiO_2$ to BaO in Tables 1 to 5, were obtained by calculations. Further, with respect to glasses 1 to 33, the temperatures $T_2$ (unit: ° C.) at which the viscosities became $10^2$ poise and the temperatures $T_4$ (unit: °C.) at which the viscosities became $10^4$ poise, were also obtained by calculations. The results are shown in the same Tables. Further, in the Tables, MgO/RO represents the value obtained by dividing the content of MgO by the total content of MgO, CaO, SrO and BaO; RO represents the total content of MgO, CaO, SrO and BaO; MgO/R'O represents the value obtained by dividing the content of MgO by the total content of MgO and CaO; SrO+BaO represents the total content of SrO and BaO; and $SiO_2+B_2O_3$ represents the total content of $SiO_2$ and $B_2O_3$.

TABLE 1

| Example | 1 | 2 | 3 | 4 | 5 | 6 | 7 | 8 | 9 |
|---|---|---|---|---|---|---|---|---|---|
| $SiO_2$ | 70.5 | 74.0 | 73.0 | 72.0 | 70.0 | 68.0 | 67.0 | 69.0 | 67.0 |
| $Al_2O_3$ | 12.5 | 11.0 | 11.0 | 11.0 | 10.0 | 11.0 | 11.0 | 13.0 | 14.0 |
| $B_2O_3$ | 8.0 | 10.0 | 9.0 | 8.0 | 6.0 | 7.0 | 7.0 | 8.0 | 7.0 |
| MgO | 5.4 | 5.0 | 7.0 | 9.0 | 14.0 | 14.0 | 15.0 | 10.0 | 12.0 |
| CaO | 3.6 | 0.0 | 0.0 | 0.0 | 0.0 | 0.0 | 0.0 | 0.0 | 0.0 |
| SrO | 0.0 | 0.0 | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 | 0.0 | 0.0 |
| MgO/RO | 0.6 | 1.0 | 1.0 | 1.0 | 1.0 | 1.0 | 1.0 | 1.0 | 1.0 |
| RO | 9.0 | 5.0 | 7.0 | 9.0 | 14.0 | 14.0 | 15.0 | 10.0 | 12.0 |
| MgO/R'O | 0.6 | 1.0 | 1.0 | 1.0 | 1.0 | 1.0 | 1.0 | 1.0 | 1.0 |
| SrO + BaO | 0.0 | 0.0 | 0.0 | 0.0 | 0.0 | 0.0 | 0.0 | 0.0 | 0.0 |
| $SiO_2 + B_2O_3$ | 78.5 | 84.0 | 82.0 | 80.0 | 76.0 | 75.0 | 74.0 | 77.0 | 74.0 |
| d | 2.36 | 2.23 | 2.30 | 2.33 | 2.39 | 2.39 | 2.40 | 2.35 | 2.39 |
| α | 25 | 20 | 22 | 23 | 27 | 27 | 28 | 23 | 24 |
| Strain point | 690 | 680 | 680 | 680 | 680 | 670 | 665 | 680 | 685 |
| $T_2$ | 1810 | 1890 | 1850 | 1820 | 1740 | 1710 | 1690 | 1760 | 1710 |
| $T_4$ | 1340 | 1390 | 1360 | 1340 | 1270 | 1250 | 1230 | 1300 | 1270 |

TABLE 2

| Example | 10 | 11 | 12 | 13 | 14 | 15 | 16 | 17 | 18 |
|---|---|---|---|---|---|---|---|---|---|
| $SiO_2$ | 64.0 | 66.0 | 70.5 | 70.5 | 70.5 | 70.5 | 70.5 | 70.5 | 70.5 |
| $Al_2O_3$ | 11.0 | 11.0 | 9.0 | 7.0 | 5.0 | 5.0 | 12.5 | 12.5 | 12.5 |
| $B_2O_3$ | 10.0 | 8.0 | 8.0 | 8.0 | 8.0 | 8.0 | 8.0 | 8.0 | 8.0 |
| MgO | 15.0 | 15.0 | 12.5 | 14.5 | 16.5 | 15.5 | 9.0 | 8.1 | 7.2 |
| CaO | 0.0 | 0.0 | 0.0 | 0.0 | 0.0 | 0.0 | 0.0 | 0.9 | 1.8 |
| SrO | 0.0 | 0.0 | 0.0 | 0.0 | 0.0 | 0.0 | 0.0 | 0.0 | 0.0 |
| BaO | 0.0 | 0.0 | 0.0 | 0.0 | 0.0 | 1.0 | 0.0 | 0.0 | 0.0 |
| MgO/RO | 1.0 | 1.0 | 1.0 | 1.0 | 1.0 | 0.94 | 1.0 | 0.9 | 0.8 |
| RO | 15.0 | 15.0 | 12.5 | 14.5 | 16.5 | 16.5 | 9.0 | 9.0 | 9.0 |
| MgO/R'O | 1.0 | 1.0 | 1.0 | 1.0 | 1.0 | 1.0 | 1.0 | 0.9 | 0.8 |
| SrO + BaO | 0.0 | 0.0 | 0.0 | 0.0 | 0.0 | 1.0 | 0.0 | 0.0 | 0.0 |
| $SiO_2 + B_2O_3$ | 74.0 | 74.0 | 78.5 | 78.5 | 78.5 | 78.5 | 78.5 | 78.5 | 78.5 |
| d | 2.39 | 2.39 | 2.35 | 2.36 | 2.37 | 2.40 | 2.34 | 2.34 | 2.35 |
| α | 28 | 28 | 26 | 28 | 30 | 32 | 22 | 23 | 24 |
| Strain point | 640 | 660 | 660 | 650 | 630 | 635 | 680 | 690 | 690 |
| $T_2$ | 1640 | 1670 | 1760 | 1750 | 1720 | 1730 | 1790 | 1800 | 1800 |
| $T_4$ | 1170 | 1210 | 1270 | 1240 | 1210 | 1220 | 1330 | 1330 | 1330 |

TABLE 3

| Example | 19 | 20 | 21 | 22 | 23 | 24 | 25 | 26 | 27 |
|---|---|---|---|---|---|---|---|---|---|
| $SiO_2$ | 70.5 | 70.5 | 70.5 | 70.5 | 70.5 | 70.5 | 70.5 | 70.5 | 70.5 |
| $Al_2O_3$ | 12.5 | 12.5 | 12.5 | 12.5 | 12.5 | 12.5 | 12.5 | 12.5 | 12.5 |
| $B_2O_3$ | 8.0 | 8.0 | 8.0 | 8.0 | 8.0 | 8.0 | 8.0 | 8.0 | 8.0 |
| MgO | 6.3 | 4.5 | 3.6 | 8.5 | 8.5 | 8.0 | 8.0 | 7.0 | 7.0 |
| CaO | 2.7 | 4.5 | 5.4 | 0.0 | 0.0 | 0.0 | 0.0 | 0.0 | 0.0 |
| SrO | 0.0 | 0.0 | 0.0 | 0.0 | 0.5 | 0.5 | 0.0 | 0.0 | 2.0 |
| BaO | 0.0 | 0.0 | 0.0 | 0.5 | 0.0 | 0.5 | 1.0 | 2.0 | 0.0 |
| MgO/RO | 0.7 | 0.5 | 0.4 | 0.94 | 0.94 | 0.89 | 0.89 | 0.78 | 0.78 |
| RO | 9.0 | 9.0 | 9.0 | 9.0 | 9.0 | 9.0 | 9.0 | 9.0 | 9.0 |
| MgO/R'O | 0.7 | 0.5 | 0.4 | 1.0 | 1.0 | 1.0 | 1.0 | 1.0 | 1.0 |
| SrO + BaO | 0.0 | 0.0 | 0.0 | 0.5 | 0.5 | 1.0 | 1.0 | 2.0 | 2.0 |
| $SiO_2 + B_2O_3$ | 78.5 | 78.5 | 78.5 | 78.5 | 78.5 | 78.5 | 78.5 | 78.5 | 78.5 |
| d | 2.35 | 2.36 | 2.36 | 2.36 | 2.35 | 2.36 | 2.37 | 2.40 | 2.37 |
| α | 25 | 26 | 27 | 23 | 23 | 24 | 24 | 25 | 25 |
| Strain point | 690 | 690 | 690 | 690 | 680 | 680 | 680 | 690 | 680 |
| $T_2$ | 1800 | 1810 | 1810 | 1790 | 1790 | 1790 | 1790 | 1790 | 1790 |
| $T_4$ | 1340 | 1340 | 1350 | 1330 | 1330 | 1340 | 1340 | 1350 | 1350 |

TABLE 4

| Example | 28 | 29 | 30 | 31 | 32 | 33 | 34 | 35 | 36 |
|---|---|---|---|---|---|---|---|---|---|
| $SiO_2$ | 69.0 | 69.0 | 69.0 | 69.0 | 69.0 | 69.5 | 73.0 | 70.0 | 70.0 |
| $Al_2O_3$ | 12.5 | 12.5 | 12.5 | 12.5 | 12.5 | 11.5 | 8.0 | 12.0 | 11.0 |
| $B_2O_3$ | 8.0 | 8.0 | 8.0 | 8.0 | 8.0 | 8.0 | 10.0 | 7.5 | 7.0 |
| MgO | 6.3 | 5.7 | 5.7 | 5.7 | 5.1 | 8.0 | 3.0 | 4.5 | 6.0 |
| CaO | 4.2 | 3.8 | 3.8 | 3.8 | 3.4 | 2.0 | 3.0 | 4.5 | 6.0 |
| SrO | 0.0 | 0.0 | 0.5 | 1.0 | 2.0 | 0.0 | 3.0 | 1.5 | 0.0 |
| BaO | 0.0 | 1.0 | 0.5 | 0.0 | 0.0 | 1.0 | 0.0 | 0.0 | 0.0 |
| MgO/RO | 0.60 | 0.54 | 0.54 | 0.54 | 0.49 | 0.73 | 0.33 | 0.43 | 0.5 |
| RO | 10.5 | 10.5 | 10.5 | 10.5 | 10.5 | 11.0 | 9.0 | 10.5 | 12.0 |
| MgO/R'O | 0.6 | 0.6 | 0.6 | 0.6 | 0.6 | 0.8 | 0.5 | 0.5 | 0.5 |
| SrO + BaO | 0.0 | 1.0 | 1.0 | 1.0 | 2.0 | 1.0 | 3.0 | 1.5 | 0.0 |
| $SiO_2 + B_2O_3$ | 77.0 | 77.0 | 77.0 | 77.0 | 77.0 | 77.5 | 83.0 | 77.5 | 77.0 |
| d | 2.38 | 2.40 | 2.40 | 2.39 | 2.40 | 2.40 | 2.36 | 2.40 | 2.40 |
| α | 27 | 28 | 28 | 28 | 28 | 27 | 28 | 27 | 28 |
| Strain point | 680 | 680 | 680 | 680 | 680 | 680 | 657 | 687 | 685 |
| $T_2$ | 1770 | 1770 | 1770 | 1760 | 1760 | 1760 | — | — | — |
| $T_4$ | 1310 | 1320 | 1320 | 1320 | 1330 | 1310 | — | — | — |

TABLE 5

| Example | 37 | 38 | 39 | 40 | 41 | 42 | 43 | 44 | 45 |
|---|---|---|---|---|---|---|---|---|---|
| $SiO_2$ | 74.3 | 73.0 | 73.0 | 75.0 | 75.0 | 72.0 | 68.1 | 68.0 | 74.0 |
| $Al_2O_3$ | 10.0 | 10.0 | 10.0 | 11.0 | 9.0 | 10.5 | 11.5 | 10.5 | 10.0 |
| $B_2O_3$ | 7.2 | 10.0 | 10.0 | 7.0 | 10.0 | 9.5 | 10.0 | 10.0 | 10.0 |
| MgO | 5.0 | 3.0 | 2.8 | 1.5 | 2.0 | 3.0 | 2.4 | 4.0 | 2.7 |
| CaO | 2.3 | 3.0 | 2.8 | 5.5 | 2.0 | 0.0 | 8.0 | 7.0 | 2.7 |
| SrO | 1.2 | 0.5 | 0.0 | 0.0 | 2.0 | 5.0 | 0.0 | 0.5 | 0.6 |
| BaO | 0.0 | 0.5 | 1.5 | 0.0 | 0.0 | 0.0 | 0.0 | 0.0 | 0.0 |
| MgO/RO | 0.59 | 0.43 | 0.39 | 0.21 | 0.33 | 0.38 | 0.23 | 0.35 | 0.45 |
| RO | 8.5 | 7.0 | 7.0 | 7.0 | 6.0 | 8.0 | 10.4 | 11.5 | 6.0 |
| MgO/R'O | 0.7 | 0.5 | 0.5 | 0.2 | 0.5 | 1.0 | 0.2 | 0.4 | 0.5 |
| SrO + BaO | 1.2 | 1.0 | 1.5 | 0.0 | 2.0 | 5.0 | 0.0 | 0.5 | 0.6 |
| $SiO_2 + B_2O_3$ | 81.5 | 83.0 | 83.0 | 82.0 | 85.0 | 81.5 | 78.1 | 78.0 | 84.0 |
| d | 2.35 | 2.33 | 2.35 | 2.34 | 2.32 | 2.39 | 2.38 | 2.39 | 2.30 |
| α | 24 | 24 | 24 | 24 | 24 | 26 | 29 | 30 | 24 |
| Strain point | 689 | 671 | 671 | 704 | 671 | 668 | 668 | 660 | 675 |

Examples 46 to 54

Further, starting materials were mixed to have the compositions shown by mol % in the rows for from $SiO_2$ to BaO in Tables 6 and 7 and melted at 1,600° C. with respect to glasses 46 to 49 and at 1,650° C. with respect to glasses 50 to 64, by means of a platinum crucible. At that time, using a platinum stirrer, stirring was carried out to homogenize the glass. Then, the molten glass was cast to form a plate and annealed. Glass 64 represents a comparative example.

With respect to glasses 46 to 64 thus obtained, the specific gravities d were measured by an Archimedes method; the expansion coefficients α were measured by a differential thermal expansion meter (TMA); the strain points were measured by a method prescribed in JIS R3103; and the Young's modulus E (unit: GPa) was measured by an ultrasonic pulse method. Further, E/d in the Table represents a specific modulus (unit: MNm/kg), which was calculated from the Young's modulus E and the specific gravity d on the basis that the specific gravity d corresponds to the value of the density represented by a unit of g/cm³.

Further, with respect to glasses 48 to 64, the temperatures $T_2$ (unit: ° C.) at which the viscosities became $10^2$ poise and the temperatures $T_4$ (unit: ° C.) at which the viscosities became $10^4$ poise, were measured by means of a rotary viscometer. Further, from the liquidus temperature and the temperature-viscosity curve obtained by the rotary viscometer, the viscosity $\eta_L$ (unit: poise) at the liquidus temperature was obtained. Further, the BHF resistance was evaluated.

Further, with respect to glasses 49, 50, 53 to 64, the above mentioned ΔW (unit: mg/cm²) was measured, and with respect to glasses 46 to 64, the BHF resistance was measured.

With respect to glasses 46 to 50, 53, 54 and 56 to 64, the following chip-forming evaluation test was carried out. Namely, two polished glass sheets of 50 mm×50 mm×0.7 mm, scribing with a length of 50 mm was imparted by means of three types of diamond wheels (dia compact wheel chips, trade name, manufactured by Mitsuboshi Diamond Kogyo K.K.) with wheel angles of 125°, 130° and 135°, respectively. The scribing was carried out by means of a glass scriber (AMUM-1-EE, manufactured by Mitsuboshi Diamond Kogyo K.K.) under such conditions that the indentation depth was 100 μm, the load was 23.5 N and the scribing speed was 200 mm/sec.

With respect to each of the above mentioned glasses, such scribing was carried out twice with respect to each diamond wheel. With respect to one of them, the scribe line was observed by an optical microscope (magnifications: 50 times) without bending the glass sheet to examine the presence or the absence of cracks of at least 20 μm or chipping of at least 20 μm.

The results are shown in tables 6 and 7. Symbol ○ in the row for BHF resistance indicates that the BHF resistance is good, and ○ in the row for chips indicates that no cracks or chipping was observed, and symbol X indicates that cracks or chipping was observed at least at one portion.

TABLE 6

| Example | 46 | 47 | 48 | 49 | 50 | 51 | 52 | 53 | 54 |
|---|---|---|---|---|---|---|---|---|---|
| $SiO_2$ | 70.0 | 69.0 | 72.5 | 70.0 | 70.0 | 71.0 | 73.0 | 72.0 | 73.0 |
| $Al_2O_3$ | 10.0 | 11.0 | 8.5 | 11.5 | 11.5 | 12.5 | 7.5 | 9.5 | 10.0 |
| $B_2O_3$ | 10.5 | 10.5 | 9.0 | 8.0 | 8.0 | 8.0 | 7.0 | 7.0 | 7.0 |
| MgO | 3.2 | 2.0 | 4.0 | 4.5 | 3.0 | 3.0 | 4.5 | 2.5 | 3.0 |
| CaO | 3.2 | 6.0 | 4.0 | 4.5 | 6.0 | 5.5 | 8.0 | 9.0 | 7.0 |
| SrO | 3.2 | 1.5 | 2.0 | 1.5 | 1.5 | 0.0 | 0.0 | 0.0 | 0.0 |
| BaO | 0.0 | 0.0 | 0.0 | 0.0 | 0.0 | 0.0 | 0.0 | 0.0 | 0.0 |
| MgO/RO | 0.33 | 0.21 | 0.4 | 0.43 | 0.29 | 0.35 | 0.36 | 0.22 | 0.30 |
| RO | 9.5 | 9.5 | 10.0 | 10.5 | 10.5 | 8.5 | 12.5 | 11.5 | 10.0 |
| MgO/R'O | 0.5 | 0.3 | 0.5 | 0.5 | 0.3 | 0.4 | 0.4 | 0.2 | 0.3 |
| SrO + BaO | 3.2 | 1.5 | 2.0 | 1.5 | 1.5 | 0.0 | 0.0 | 0.0 | 0.0 |
| $SiO_2 + B_2O_3$ | 80.5 | 79.5 | 81.5 | 78.0 | 78.0 | 79.0 | 80.0 | 79.0 | 80.0 |
| d | 2.384 | 2.378 | 2.372 | 2.397 | 2.399 | 2.366 | 2.365 | 2.376 | 2.360 |
| α | 28.2 | 28.3 | 28.2 | 27.5 | 29.6 | 25.9 | 30.3 | 30.3 | 28.2 |
| Strain point | 656 | 663 | 665 | 681 | 678 | 688 | 671 | 682 | 686 |
| E | 70.3 | 72.1 | 71.2 | 75.1 | 74.5 | 75.7 | 75.2 | 75.8 | 75.1 |
| E/d | 29.5 | 30.3 | 30.0 | 31.3 | 31.1 | 32.0 | 31.8 | 31.9 | 31.8 |
| $T_2$ | — | — | 1800 | 1740 | 1740 | 1740 | 1780 | 1780 | 1800 |
| $T_4$ | — | — | 1370 | 1330 | 1340 | 1340 | 1350 | 1350 | 1380 |
| $\eta_L$ | — | — | $10^{4.9}$ | $10^{4.1}$ | $10^{4.2}$ | $10^{3.9}$ | $10^{4.5}$ | $10^{5.0}$ | $10^{4.9}$ |
| ΔW | — | — | — | 0.36 | 0.20 | — | — | 0.06 | 0.16 |
| BHF resistance | ○ | ○ | ○ | ○ | ○ | ○ | ○ | ○ | ○ |
| Chips | ○ | ○ | ○ | ○ | ○ | — | — | ○ | ○ |

TABLE 7

| Example | 55 | 56 | 57 | 58 | 59 | 60 | 61 | 62 | 63 | 64 |
|---|---|---|---|---|---|---|---|---|---|---|
| $SiO_2$ | 73.0 | 71.0 | 70.5 | 71.0 | 70.5 | 69.5 | 70.0 | 68.6 | 70.0 | 67.6 |
| $Al_2O_3$ | 8.5 | 11.5 | 10.5 | 11.5 | 10.5 | 11.5 | 11.0 | 11.4 | 11.5 | 11.4 |
| $B_2O_3$ | 8.0 | 7.0 | 7.5 | 7.0 | 7.0 | 7.0 | 7.0 | 6.8 | 7.5 | 8.7 |
| MgO | 2.0 | 4.5 | 3.5 | 3.5 | 5.0 | 3.0 | 2.5 | 2.0 | 3.5 | 1.4 |
| CaO | 8.5 | 4.5 | 5.5 | 5.5 | 5.5 | 7.0 | 7.5 | 11.2 | 6.0 | 5.2 |
| SrO | 0.0 | 1.5 | 2.5 | 1.5 | 1.5 | 2.0 | 2.0 | 0.0 | 1.5 | 1.3 |
| BaO | 0.0 | 0.0 | 0.0 | 0.0 | 0.0 | 0.0 | 0.0 | 0.0 | 0.0 | 4.3 |
| MgO/RO | 0.19 | 0.43 | 0.30 | 0.33 | 0.42 | 0.25 | 0.21 | 0.15 | 0.32 | 0.11 |
| RO | 10.5 | 10.5 | 11.5 | 10.5 | 12.0 | 12.0 | 12.0 | 13.2 | 11.0 | 12.2 |
| MgO/R'O | 0.19 | 0.50 | 0.39 | 0.39 | 0.48 | 0.30 | 0.25 | 0.15 | 0.37 | 0.21 |
| SrO + BaO | 0.0 | 1.5 | 2.5 | 1.5 | 1.5 | 2.0 | 2.0 | 0.0 | 1.5 | 5.6 |
| $SiO_2 + B_2O_3$ | 81.0 | 78.0 | 78.0 | 78.0 | 77.5 | 76.5 | 77.0 | 75.4 | 77.5 | 76.3 |
| d | 2.350 | 2.399 | 2.416 | 2.403 | 2.406 | 2.429 | 2.426 | 2.419 | 2.404 | 2.55 |
| α | 30.0 | 27.5 | 31.3 | 28.0 | 29.6 | 32.2 | 32.9 | 34.0 | 30.9 | 39 |
| Strain point | 673 | 685 | 675 | 686 | 678 | 682 | 680 | 688 | 680 | 660 |
| E | 72.2 | 76.3 | 75.9 | 77.2 | 75.8 | 76.7 | 76.0 | 75.5 | 76.2 | 70 |
| E/d | 30.9 | 31.8 | 31.4 | 32.1 | 31.5 | 31.6 | 31.3 | 31.2 | 31.7 | 27.3 |
| $T_2$ | 1810 | 1750 | 1760 | 1790 | 1740 | 1730 | 1750 | 1720 | 1750 | 1720 |
| $T_4$ | 1370 | 1340 | 1350 | 1360 | 1330 | 1330 | 1340 | 1310 | 1340 | 1320 |
| $\eta_L$ | $10^{5.1}$ | $10^{4.2}$ | $10^{4.8}$ | $10^{4.2}$ | $10^{4.7}$ | $10^{4.7}$ | $10^{4.2}$ | $10^{4.9}$ | $10^{4.2}$ | $>10^6$ |
| ΔW | 0.35 | 0.23 | 0.10 | 0.14 | 0.20 | 0.09 | 0.06 | 0.07 | 0.14 | 0.08 |
| BHF resistance | ○ | ○ | ○ | ○ | ○ | ○ | ○ | ○ | ○ | ○ |
| Chips | — | ○ | ○ | ○ | ○ | ○ | ○ | ○ | ○ | x |

By using the glass of the present invention which has a low specific gravity, it is possible to reduce the weight of a glass substrate for a liquid crystal display device, or it is possible to improve the production efficiency because of the low expansion coefficient. Further, it is possible to provide a glass substrate excellent in the chemical durability against e.g. hydrochloric acid to be used for etching of e.g. ITO and excellent in the chemical durability against a buffered hydrofluoric acid to be used for etching of $SiO_x$ or $SiN_x$. In addition, it is possible to reduce the frequency of breakage of glass substrates or glass sheets during the transportation, and it is possible to obtain a glass which is scarcely devitrified, to obtain a glass which scarcely forms glass chips, and to improve the production efficiency.

What is claimed is:

1. An alkali-free glass consisting essentially of:

| | |
|---|---|
| $SiO_2$ | 69.5 to 76 mol %, |
| $Al_2O_3$ | 5 to 12.5 mol %, |
| $B_2O_3$ | 5 to 16 mol %, |
| MgO | 1.5 to 12 mol %, |
| CaO | 2 to 14 mol %, |
| SrO | 0 to 3 mol %, and |
| BaO | 0 to 1.5 mol %, wherein |

$Al_2O_3/B_2O_3 \leq 1.7$,
CaO/(MgO+CaO+SrO) is from 0.52 to 0.85,
MgO/(MgO+CaO+SrO+BaO) is at least 0.15,
the alkali-free glass has a specific gravity of $\leq 2.46$, and a surface of said alkali-free glass is not turbidified when the glass is immersed in an aqueous hydrochloric acid solution having a concentration of 0.1 mol/l at 90° C. for 20 hours.

2. The alkali-free glass according to claim 1, which has an average linear expansion coefficient of at most $34 \times 10^{-7}$/° C. within a range of from 50 to 350° C.

3. The alkali-free glass according to claim 1, which has a Young's modulus of at least 64 GPa.

4. The alkali-free glass according to claim 1, which has a strain point of at least 650° C.

5. A method of making an alkali-free glass, the method comprising melting starting materials, and producing the glass of claim 1.

6. An alkali-free glass consisting essentially of

| | |
|---|---|
| $SiO_2$ | 64 to 76 mol %, |
| $Al_2O_3$ | 5 to 14 mol %, |
| $B_2O_3$ | 5 to 16 mol %, |
| MgO | 1.5 to 16.5 mol %, |
| CaO | 0.5 to 14 mol %, |
| SrO | 0 to 6 mol %, and |
| BaO | 0 to 1.5 mol %, wherein |

MgO/(MgO+CaO+SrO+BaO) is at least 0.15, $SiO_2+B_2O_3$ is at least 79 mol %, and the alkali-free glass has a specific gravity $\leq 2.38$.

7. The alkali-free glass according to claim 6, wherein MgO$\leq$4 mol %.

8. The alkali-free glass according to claim 6, wherein CaO$\leq$10 mol %.

9. The alkali-free glass according to claim 6, which has an average linear expansion coefficient of at most $34 \times 10^{-7}$/° C. within a range of from 50 to 350° C.

10. The alkali-free glass according to claim 6, which has a Young's modulus of at least 64 GPa.

11. The alkali-free glass according to claim 6, which has a strain point of at least 650° C.

12. A method of making an alkali-free glass, the method comprising melting starting materials, and producing the glass of claim 6.

13. An alkali-free glass consisting essentially of

| | |
|---|---|
| $SiO_2$ | 64 to 76 mol %, |
| $Al_2O_3$ | 7.5 to 14 mol %, |
| $B_2O_3$ | 5 to 16 mol %, |
| MgO | 1.5 to 4 mol %, |
| CaO | 2 to 10 mol %, |
| SrO | 0 to 2.5 mol %, and |
| BaO | 0 to 0.5 mol %, wherein |

$Al_2O_3/B_2O_3 \leq 1.7$,

CaO/(MgO+CaO+SrO) is from 0.52 to 0.85,

MgO+CaO+SrO+BaO is at most 10.5 mol %,

SrO+BaO is from 0 to 2.5 mol %, $SiO_2+B_2O_3$ is at most 80 mol %, the alkali-free glass has a specific gravity $\leq 2.46$, and a surface of said alkali-free glass is not turbidified when the glass is immersed at 25° C. for 20 minutes in a solution obtained by mixing an aqueous ammonium fluoride solution having a mass percentage concentration of 40% and an aqueous hydrofluoric acid solution having a mass percentage concentration of 50% in a volume ratio of 9:1.

14. The alkali-free glass according to claim 13, which has an average linear expansion coefficient of at most $34 \times 10^{-7}$/° C. within a range of from 50 to 350° C.

15. The alkali-free glass according to claim 13, which has a Young's modulus of at least 64 GPa.

16. The alkali-free glass according to claim 13, which has a strain point of at least 650° C.

17. A method of making an alkali-free glass, the method comprising melting starting materials, and producing the glass of claim 13.

* * * * *